United States Patent [19]

Block

[11] 4,104,643
[45] Aug. 1, 1978

[54] ECHO-SOUNDING RECORDER WITH DIFFERENT DEPTH-MEASURING RANGES

[75] Inventor: Dieter Block, Kiel, Germany

[73] Assignee: Electroacustic GmbH, Kiel, Germany

[21] Appl. No.: 817,489

[22] Filed: Jul. 20, 1977

[30] Foreign Application Priority Data

Jul. 21, 1976 [DE] Fed. Rep. of Germany ....... 2632799

[51] Int. Cl.² .............................................. G01D 9/00
[52] U.S. Cl. .................................. 346/17; 346/33 EC
[58] Field of Search .................... 346/17, 33 EC, 65; 340/3 F

[56] References Cited

U.S. PATENT DOCUMENTS

| | | | |
|---|---|---|---|
| 2,710,787 | 6/1955 | Witt | 346/17 X |
| 2,892,666 | 6/1959 | Parker et al. | 346/17 |
| 2,941,183 | 6/1960 | Bischof | 346/65 UX |
| 3,177,492 | 4/1965 | Dudley | 346/33 EC |

*Primary Examiner*—George H. Miller, Jr.
*Attorney, Agent, or Firm*—Herbert L. Lerner

[57] ABSTRACT

In an echo-sounding recorder wherein received echoes are recorded on a common recording surface, starting from a common zero mark, by means of a recording member moving with uniform velocity, the echo-sounding recorder being switchable to different depth-measuring ranges, respective switching members operable independently of one another for setting the recorder to different main measuring ranges and to different offset measuring ranges, and a scale associated with each of the measuring ranges, the improvement therein includes a scale carrier carrying all of the scales in a common plane, the scale carrier being formed of at least two parts respectively displaceable vertically and horizontally relative to one another, a cover plate disposed in front of the scale carrier parallel to the recorder and formed with a row of windows spaced from one another a distance corresponding to the distance between divisions of the respective scales, the scale carrier being mounted for movement relative to the cover plate in two mutually perpendicular directions disposed in the common plane of the scales over a distance corresponding to the scale offset, and kinematic transmission means for coupling the scale carrier to the switching members so that actuation of one of the switching member moves the scale carrier in one of the mutually perpendicular directions, and actuation of the other of the switching members moves the scale carrier in the other of the mutually perpendicular directions, each of the movements of the scale carrier being equal to the respective horizontal and vertical offset of the scales or a multiple thereof.

4 Claims, 2 Drawing Figures

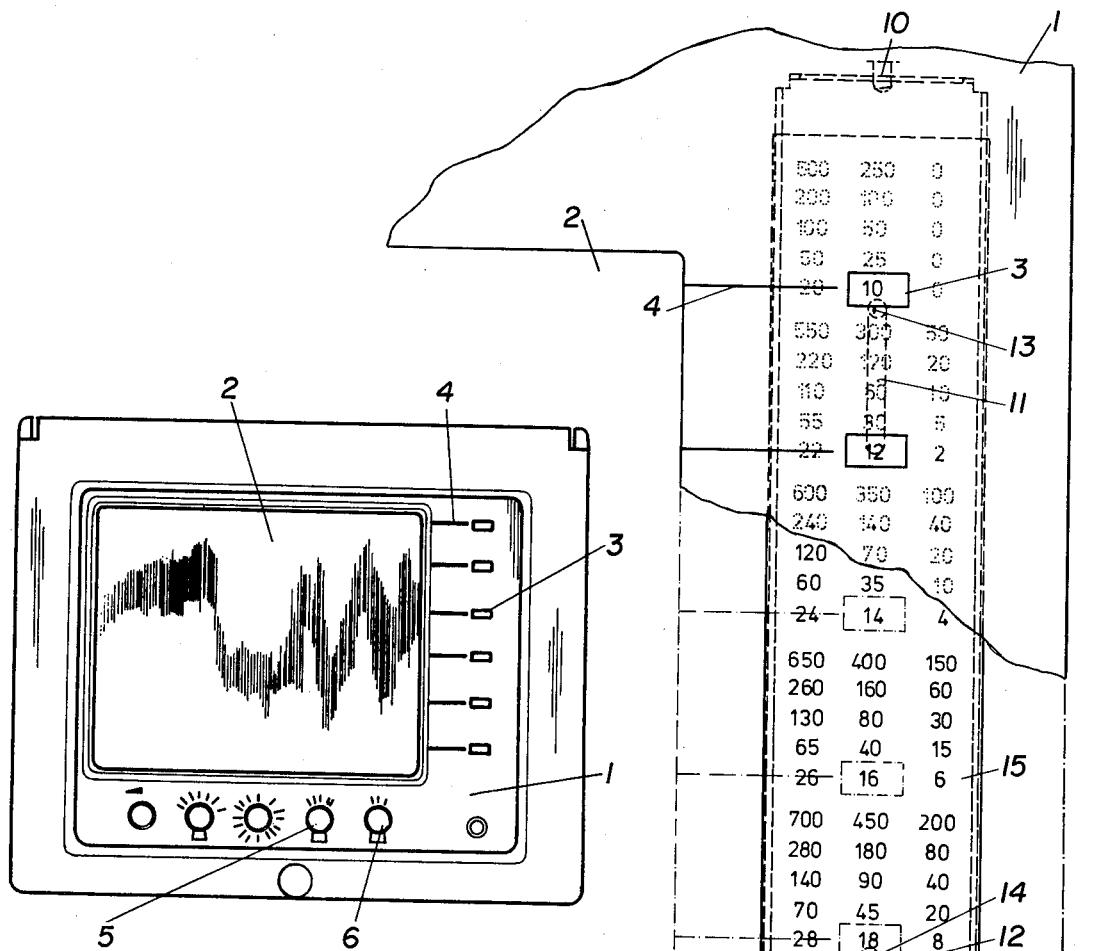
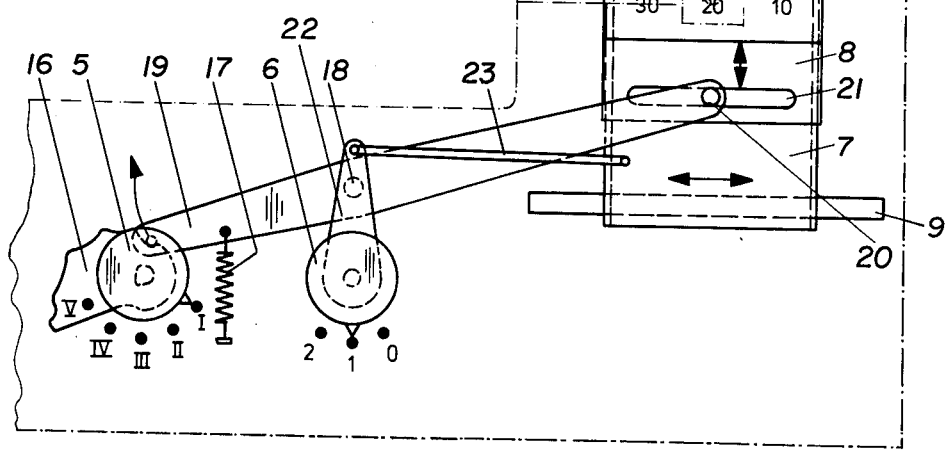
Fig.1
Fig.2

ECHO-SOUNDING RECORDER WITH DIFFERENT DEPTH-MEASURING RANGES

The invention relates to an echo-sounding recorder, wherein echoes that are received are recorded on a common recording surface, starting from a common zero mark, by means of a recording member moving with uniform velocity, the echo-sounding recorder being switchable to different depth-measuring ranges, respective switching members operable independently of one another being provided for switching over to different main measuring ranges and to different offset measuring ranges, and a scale disposed on a scale carrier being associated with each of these depth-measuring ranges.

Main measuring ranges are ranges which begin with zero, and offset ranges are ranges which begin at the end value of a main measuring range or of a previous offset range.

In echo-sounding recorders of the heretofore known types, the scales for the individual depth measuring ranges are disposed visibly side by side, so that, when reading the depth values quickly, it is ofter difficult to correlate the proper depth scale to the respectively set depth measuring range; this is not conducive to the avoidance of possible reading errors due to inadvertently reading from the wrong scale. In order to eliminate this disadvantage, the various scales have been marked in different colors, and the color symbol corresponding to the scale has been associated with the individual depth measuring ranges. While the correlation of the scales is made more distinct thereby, it must be made anew by the reader for each reading. In addition, the confusion caused by the different numberings which are visible next to each other and on top of each other, is not eliminated thereby.

It is therefore an object of the invention to eliminate this disadvantage i.e. to provide an echo-sounding recorder which makes possible according to the respective set depth measuring range, a reading on the proper depth scale that is readily perceptible and cannot be confused.

With the foregoing and other objects in view, there is provided in accordance with the invention, in an echo-sounding recorder wherein received echoes are recorded on a common recording surface, starting from a common zero mark, by means of a recording member moving with uniform velocity, the echo-sounding recorder being switchable to different depth-measuring ranges, respective switching members operable independently of one another for setting the recorder to different main measuring ranges and to different offset measuring ranges, and a scale associated with each of the measuring ranges. The improvement therein comprises a scale carrier carrying all of the scales in a common plane, the scale carrier being formed of at least two parts respectively displaceable vertically and horizontally relative to one another, a cover plate disposed in front of the scale carrier parallel to the recorder and formed with a row of windows spaced from one another a distance corresponding to the distance between divisions of the respective scales, the scale carrier being mounted for movement relative to the cover plate in two mutually perpendicular directions disposed in the common plane of the scales over a distance corresponding to the scale offset, and kinematic transmission means for coupling the scale carrier to the switching members so that actuation of one of the switching members moves the scale carrier in one of the mutually perpendicular directions, and actuation of the other of the switching members moves the scale carrier in the other of the mutually perpendicular directions, each of the movements of the scale carrier being equal to the respective horizontal and vertical offset of the scales or a mutiple thereof.

What is achieved with the invention of the instant application is that only the scale associated with the respective measuring range is always visible, while all other scales provided on the scale carrier remain invisible.

In accordance with another feature of the invention, the two parts of the scale carrier are two support plates disposed one behind the other, one of the plates being shiftable horizontally and the other of the plates being shiftable vertically.

In accordance with a further feature of the invention, both of the switching members are rotary switches having respective rotary shafts, and including a one-armed lever extending radially from the shaft of one of the rotary switches and a rod linked to the one-armed lever and coupling the lever to the rear support plate, a cam mounted on the shaft of the other of the rotary switches, one of the lever arms of a two-armed lever spring-biased into engagement with the cam, the front support plate being formed with a transverse slot extending perpendicularly to the vertical shifting direction, the other of the lever arms of the two-armed lever carrying a pin engaging in the slot in the form of a cross slide.

In accordance with an alternate feature of the invention, there is provided an echo-sounding recorder wherein received echoes are recorded on a common recording surface, starting from a common zero mark, by means of a recording member moving with uniform velocity, the echo-sounding recorder being switchable to different depth-measuring ranges, respective switching members operable independently of one another for setting the recorder to different main measuring ranges and to different offset measuring ranges, and a scale associated with each of the measuring ranges. The improvement therein comprises a scale carrier carrying all of the scales in a common plane, the scale carrier being in the form of a support plate displaceable in vertical direction, a cover plate disposed in front of the scale carrier parallel to the recorder and formed with a row of windows spaced from one another a distance corresponding to the distance between divisions of the respective scales, the cover plate being displaceable in horizontal direction, the scale carrier and the cover plate being mounted for movement relative to one another in two mutually perpendicular directions disposed in the common plane of the scale over a distance corresponding to the scale offset, and kinematic transmission means for coupling the scale carrier and the cover plate to the switching members so that actuation of one of the switching members moves the scale carrier in vertical direction, and actuation of the other of the switching members moves the cover plate in horizontal direction, each of the movements of the scale carrier and of the cover plate being equal to the respective horizontal and vertical offset of the scales or a multiple thereof.

Other features which are considered as characteristic for the invention are set forth in the appended claims.

Although the invention is illustrated and described herein as embodied in echo-sounding recorder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a front elevational view of an echo-sounding recorder constructed in accordance with the invention; and FIG. 2 is an enlarged fragmentary view of FIG. 1, with the front cover plate partly broken away, showing diagrammatically the scale carrier device located behind the front cover plate.

Referring now to the drawing and first, particularly, to FIG. 1 thereof, there is shown the echo-sounding recorder of the invention having a face or cover plate 1, which is provided in front of a scale carrier device to be described in greater detail hereinafter with respect to FIG. 2, and which, in addition, covers up the actuating fittings and other equipment. A large window 2 through which a record carrier, such as a video screen, is visible, is provided in the cover plate 1. The numbering of the scale corresponding to the respective adjusted measuring range appears in small windows 3. Scale divisions or lines 4 are also provided and simultaneously serve as guidelines for the eye of the observer or reader.

Underneath the large window 2 are different operating and control knobs. They include a rotary knob 5 of a switch for the main measuring range and a rotary knob 6 of a switch for offset ranges.

In FIG. 2, the front cover plate 1 is shown broken away, so that the lower part of the scale carrier device and the switching members are exposed.

The scale carrier device is formed, in substance, of two support plates 7 and 8 disposed one behind the other. The rear support plate 7 as viewed in FIG. 2, is guided at the lower end thereof by means of a guide bar 9 fixed to the housing of the recorder, so as to be shiftable horizontally parallel thereto, as shown by the double headed arrow associated with the guide bar 9; at the upper end of the support plate 7, the latter is formed with an angle portion extending toward the rear i.e. into the plane of the drawing of FIG. 2, and the angle portion is formed with a transverse slot, through which a mounting pin 10 extends. The support plate 7 is additionally formed with two vertical guide slots 11 and 12, through which respective pins 13 and 14, that are fastened to the rear side of the front support plate 8, extend. The support plate 8 is vertically shiftably mounted on the support plate 7. It would, of course, also be equally possible if, in reverse, the support plate 7 were guided vertically shiftably and the support plate 8 were mounted thereon so as to be horizontally shiftable. In either case, the result is the same: the front support plate 8 can be displaced relative to the front face or cover plate 1 in two mutually perpendicular directions.

In principle, the support plate 8 may be provided with the scale numbering; for practical reasons, however, (for example, ready interchangeability) a separate number plate 15 is placed on the support plate 8 and is held there by non-illustrated releasable fastening means, such as clamps, for example.

The device as described hereinbefore is coupled to the range switches in the following manner:

The main measuring range switch, which is actuated by the rotary knob 5, has a shaft on which a detent cam 16 is mounted. On this cam 16, there rest, under the biasing force of a spring 17, one lever arm of a two-arm lever 19 which is pivoted at a point 18. The other lever arm of the lever 19 carries a pin 20, by which it engages in a horizontal slot 21 formed in the support plate 8, like a cross slide.

If the main measuring range switch is then turned by means of the rotary knob 5 thereof, the cam 16 tilts or pivots the lever 19 which, in turn, moves the support plate 8 in vertical direction, as represented by the double-headed vertical arrow shown in FIG. 2. The layout and the dimensions of the components of the device are such that, when switching to the next range, the support plate 8 is shifted by just such an extent that, instead of the number that was theretofore visible in each of the small windows 3, the number above or below that number then appears in the respective window 3. Undesired lateral displacement or shift of the support plate 8 does not occur because of the sliding of the pin 20 in the slot 21.

The switch for the offset ranges (rotary knob 6) carries on the shaft thereof a one-arm lever 22, which is linked to the support plate 7 by a rod 23. When this last-mentioned switch is operated by turning the rotary knob 6, the respective number to the left-hand or right-hand side next to the theretofore visible number will accordingly appear in each of the windows 3.

If it is important to limit the number of or conserve the components, the device of the invention can also be constructed so that only a vertically shiftable support plate and a horizontally movable front cover plate are provided, and the front cover plate is kinematically coupled to one of the two switches, namely, in the illustrated embodiment, to the switch for the offset ranges.

There are claimed:

1. In an echo-sounding recorder wherein received echoes are recorded on a common recording surface, starting from a common zero mark, by means of a recording member moving with uniform velocity, the echo-sounding recorder being switchable to different depth-measuring ranges, respective switching members operable independently of one another for setting the recorder to different main measuring ranges and to different offset measuring ranges, and a scale associated with each of the measuring ranges, the improvement therein comprising a scale carrier carrying all of the scales in a common plane, said scale carrier being formed of at least two parts respectively displaceable vertically and horizontally relative to one another, a cover plate disposed in front of said scale carrier parallel to the recorder and formed with a row of windows spaced from one another a distance corresponding to the distance between divisions of the respective scales, said scale carrier being mounted for movement relative to said cover plate in two mutually perpendicular directions disposed in the common plane of the scales over a distance corresponding to the scale offset, and kinematic transmission means for coupling said scale carrier to the switching members so that actuation of one of the switching members moves the scale carrier in one of said mutually perpendicular directions, and actuation of the other of the switching members moves the scale carrier in the other of said mutually perpendicular directions, each of the movements of the scale carrier being equal to the respective horizontal and vertical offset of the scales or a multiple thereof.

2. Echo-sounding recorder according to claim 1 wherein said two parts of said scale carrier are two support plates disposed one behind the other, one of said plates being shiftable horizontally and the other of said plates being shiftable vertically.

3. Echo-sounding recorder according to claim 2 wherein both of said switching members are rotary switches having respective rotary shafts, and including a one-armed lever extending radially from the shaft of one of said rotary switches and a rod linked to said one-armed lever and coupling said lever to the rear support plate, a cam mounted on the shaft of the other of said rotary switches, one of the lever arms of a two-armed lever spring-biased into engagement with said cam, the front support plate being formed with a transverse slot extending perpendicularly to the vertical shifting direction, the other of the lever arms of said two-armed lever carrying a pin engaging in said slot in the form of a cross slide.

4. In an echo-sounding recorder wherein received echoes are recorded on a common recording surface, starting from a common zero mark, by means of a recording member moving with uniform velocity, the echo-sounding recorder being switchable to different depth-measuring ranges, respective switching members operable independently of one another for setting the recorder to different main measuring ranges and to different offset measuring ranges, and a scale associated with each of the measuring ranges, the improvement therein comprising a scale carrier carrying all of the scales in a common plane, said scale carrier being in the form of a support plate displaceable in vertical direction, a cover plate disposed in front of said scale carrier parallel to the recorder and formed with a row of windows spaced from one another a distance corresponding to the distance between divisions of the respective scales, said cover plate being displaceable in horizontal direction, said scale carrier and said cover plate being mounted for movement relative to one another in two mutually perpendicular directions disposed in the common plane of the scales over a distance corresponding to the scale offset, and kinematic transmission means for coupling said scale carrier and said cover plate to the switching members so that actuation of one of the switching members moves the scale carrier in vertical direction, and actuation of the other of the switching members moves the cover plate in horizontal direction, each of the movements of the scale carrier and of the cover plate being equal to the respective horizontal and vertical offset of the scales or a multiple thereof.

* * * * *